(12) United States Patent
Lin et al.

(10) Patent No.: US 11,417,139 B2
(45) Date of Patent: Aug. 16, 2022

(54) DISPLAY DEVICE

(71) Applicants: Reco Technology (Chengdu) Co., Ltd, Chengdu (CN); Reco BioTek Co., Ltd, Toufen (TW)

(72) Inventors: Sincheng Lin, Toufen (TW); Chungwu Liu, Toufen (TW)

(73) Assignees: RECO TECHNOLOGY (CHENGDU) CO., LTD, Chengdu (CN); RECO BIOTEK CO., LTD, Toufen (TW)

( * ) Notice: Subject to any disclaimer, the term of this patent is extended or adjusted under 35 U.S.C. 154(b) by 17 days.

(21) Appl. No.: 17/147,701

(22) Filed: Jan. 13, 2021

(65) Prior Publication Data
US 2022/0198171 A1 Jun. 23, 2022

(30) Foreign Application Priority Data
Dec. 22, 2020 (CN) .......................... 202011527828.4

(51) Int. Cl.
*G06V 40/13* (2022.01)

(52) U.S. Cl.
CPC ................................ *G06V 40/1306* (2022.01)

(58) Field of Classification Search
CPC ..... G06V 40/13–1394; G06V 40/1306; G06V 40/1347; H04R 7/045; H04R 17/00–10; H04R 2499/15; H04R 17/005; H04R 17/02; H04R 17/025; H04R 2499/10; H04R 2499/11; H04R 2499/00–15; H04R 1/28; H04R 1/2807; H04R 2217/03; H04R 1/028; G06F 21/32; G06F 3/0412; G06F 3/043–0436; G06F 1/1652; G06F 3/016; G06F 3/04144; G06F 3/04166; H01L 27/3225–3234; H01L 41/297; H01L 41/29–297; H01L 41/081; H01L 41/0825; H01L 41/0973; H01L 27/156; H01L 27/32; H01L 41/047; H01L 41/0471; H01L 41/083; H01L 41/0986; H01L 41/1132; H01L 41/183; H01L 41/27; H01L 41/37
USPC ......................................................... 382/124
See application file for complete search history.

(56) References Cited

U.S. PATENT DOCUMENTS

| | | | |
|---|---|---|---|
| 2015/0241393 A1* | 8/2015 | Ganti ...................... | G01N 29/09 73/589 |
| 2017/0053151 A1* | 2/2017 | Yeke Yazandoost .... | A61B 8/00 |
| 2019/0122018 A1* | 4/2019 | Kho ................... | G06V 40/1306 |
| 2020/0059733 A1* | 2/2020 | Shin ........................ | H04R 7/045 |
| 2020/0213712 A1* | 7/2020 | Han ...................... | H01L 41/081 |
| 2020/0410194 A1* | 12/2020 | Kim ..................... | H01L 41/0471 |
| 2021/0176567 A1* | 6/2021 | Lee ........................... | H04R 1/24 |

\* cited by examiner

*Primary Examiner* — Amr A Awad
*Assistant Examiner* — Aaron Midkiff
(74) *Attorney, Agent, or Firm* — Locke Lord LLP; Tim Tingkang Xia, Esq.

(57) ABSTRACT

The present invention is a display device, comprising a display module, a fingerprint recognition module and a speaker module. The back of the display module is provided with a fingerprint recognition module and a speaker module. A common electrode layer is arranged between the fingerprint recognition module and the speaker module, so that the thickness of the display can be greatly reduced.

15 Claims, 7 Drawing Sheets

DISPLAY DEVICE

REFERENCE TO RELATED APPLICATIONS

The present application is based on, and claims priority from, Chinese application number 202011527828.4, filed Dec. 22, 2020, the disclosure of which is hereby incorporated by reference herein in its entirety.

FIELD OF THE INVENTION

The present invention relates to a display, and more particularly, to display device.

BACKGROUND OF THE INVENTION

In recent years, fingerprint recognition functions have become standard equipment on smart electronic products. Early capacitive fingerprint recognition used numerous tiny capacitor arrays that were used to form a sensor. When the user touches the sensor with their finger, the raised area of the fingerprint contacts the capacitor, but the recessed area does not, so that there will be a difference in capacitance and the fingerprint can be captured. However, because capacitive fingerprint recognition sensors occupy part of the surface of smart electronic products, recent design trends for smart electronic products aim toward full-screen design, which have made capacitive fingerprint recognition sensors gradually disappear from smart electronic products.

The alternative technical solution is to install an optical fingerprint recognition sensor and an ultrasonic fingerprint recognition sensor under the screen of the smart electronic product, wherein the optical fingerprint recognition sensor projects light through the sensor. The fingerprint pattern is drawn through reflection, but the product design trend of thinner smart electronic products makes optical fingerprint recognition sensors unable to use ordinary optical illumination methods, but instead require the help of smart product screens to provide light sources. Generally, the screen can independently emit light to provide a light source, and most are organic liquid crystal displays (OLED). In addition, optical fingerprint recognition sensors consume more power, and the recognition rate is poor when the fingertips are too dry.

Furthermore, for the ultrasonic fingerprint recognition sensor, when the finger touches the sensor, the sensor emits ultrasonic waves to the finger, and a 3D image is constructed using the ultrasonic waves. The advantage of ultrasonic fingerprint recognition is that it has strong penetrability and high anti-misreading ability. Even if wet fingers and dirty fingers are placed above the screen of smart electronic products, they can be successfully recognized.

In addition, in order to make the appearance of smart electronic products more concise, if you want to install an ultrasonic fingerprint recognition sensor and a thin film speaker below the screen of the smart product, after the ultrasonic fingerprint recognition sensor is installed, the space at the bottom of the screen is limited. Also, it is not easy to set up a thin-film speaker, or to set up an ultrasonic fingerprint recognition sensor in a part of the area under the screen as they must be set up in different sections of the area under the screen which is limited. The user can only perform fingerprint recognition at the position corresponding to the ultrasonic fingerprint recognition sensor, which is quite inconvenient for the user.

SUMMARY OF THE INVENTION

In view of the problems of the prior art, a purpose of the present invention is to provide an ultrasonic fingerprint recognition module and a speaker module positioned below the display module. Because the ultrasonic fingerprint recognition module and the speaker module have a structure that partially has the same function, the two can be combined to reduce the thickness, and the display module can be combined with the ultrasonic fingerprint recognition module and the speaker module.

According to an object of the present invention, a display device is provided, which includes a display module, a fingerprint recognition module and a speaker module, wherein the back of the display module is provided with the fingerprint recognition module and the speaker module in sequence, and there is a common electrode layer between the fingerprint recognition module and the speaker module. When the fingerprint recognition module and the common electrode layer are connected, fingerprint recognition can be performed, and when the speaker module and the common electrode layer are connected, sound can be output.

The fingerprint recognition module includes a first connection layer, a signal matching layer, a first electrode layer, a first piezoelectric film layer, and a substrate layer, and the speaker module includes a second connection layer, a second piezoelectric film layer, and a second electrode layer. One side of the first connection layer is connected to the back of the display module, the other side of the first connection layer is provided with a signal matching layer, and the side of the signal matching layer opposite to the first connection layer is provided with a first electrode layer, The side of the first electrode layer opposite to the signal matching layer is provided with a first piezoelectric film layer, the side of the first piezoelectric film layer opposite to the first electrode layer is provided with a substrate layer, and the common electrode layer is provided behind the first piezoelectric film layer. On a side of the substrate layer, the second connection layer is connected to the side of the common electrode layer facing away from the substrate layer, the second piezoelectric film layer is disposed on the side of the second connection layer facing away from the common electrode layer, and the second electrode layer is disposed on the second connection side of the layer facing away from the second piezoelectric film layer.

In another embodiment, the fingerprint recognition module includes a first connection layer, a substrate layer, and a first piezoelectric film layer, one side of the first connection layer is connected to the back of the display module, and the other side of the first connection layer and one side of the substrate layer are connected, and the other side of the substrate layer is provided with a first piezoelectric film layer. The common electrode layer is provided on the side of the first piezoelectric film layer facing away from the substrate layer. The substrate layer is opposite to the first piezoelectric film layer. The position is provided with a structure equivalent to the first electrode layer. The speaker module includes a second connection layer, a second piezoelectric film layer, and a second electrode layer. The second connection layer is connected to the side of the common electrode layer facing away from the substrate layer, and the second piezoelectric film layer is disposed on the back of the second connection layer. On the side of the common electrode layer, the second electrode layer is arranged on the side of the second connection layer opposite to the second piezoelectric film layer.

In yet another embodiment, the fingerprint recognition module includes a first connection layer, a signal matching layer, a first piezoelectric film layer, and a substrate layer, and the speaker module includes a second piezoelectric film layer and a second electrode layer. One side of the first connection layer is connected to the back of the display module, the other side of the first connection layer is provided with a signal matching layer, the side of the signal matching layer opposite to the first connection layer is provided with a common electrode layer, and the first piezoelectric film layer is set on a partial area of the side of the common electrode layer facing away from the signal matching layer, the substrate layer is set on the side of the first piezoelectric film layer facing away from the common electrode layer, and the second piezoelectric film layer is set on the common electrode layer facing away from the signal matching layer. The second electrode layer is arranged on the side of the second piezoelectric film layer facing away from the signal matching layer.

In summary, when a voltage difference is generated between the common electrode layer and the first electrode layer, the first piezoelectric film layer will act as and have a fingerprint recognition function, or when the common electrode layer and the second electrode layer have a voltage difference between them, the second piezoelectric film layer will work and have a speaker function. In addition, when the substrate layer is made to have a structure equivalent to the first electrode layer, so that the common electrode layer and the substrate layer are connected, the first piezoelectric film layer will function and have a fingerprint recognition function, so that it can have the fingerprint recognition function and the speaker function simultaneously, and the fingerprint recognition function is completely arranged under the display module. The user can realize fingerprint recognition at any position on the surface of the display at will.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

FIG. 2 is a schematic diagram of the fingerprint recognition module of the first embodiment of the present invention when turned on.

FIG. 5 is a schematic diagram of the fingerprint recognition module of the first embodiment of the present invention when turned on.

DETAILED DESCRIPTION OF THE PREFERRED EMBODIMENTS

In order to make the objectives, technical solutions, and advantages of the present invention clearer, the following further describes the present invention in detail with reference to the accompanying drawings and embodiments. It should be understood that the specific embodiments described here are only used to explain the present invention, but not used to limit the present invention.

Figure 1:
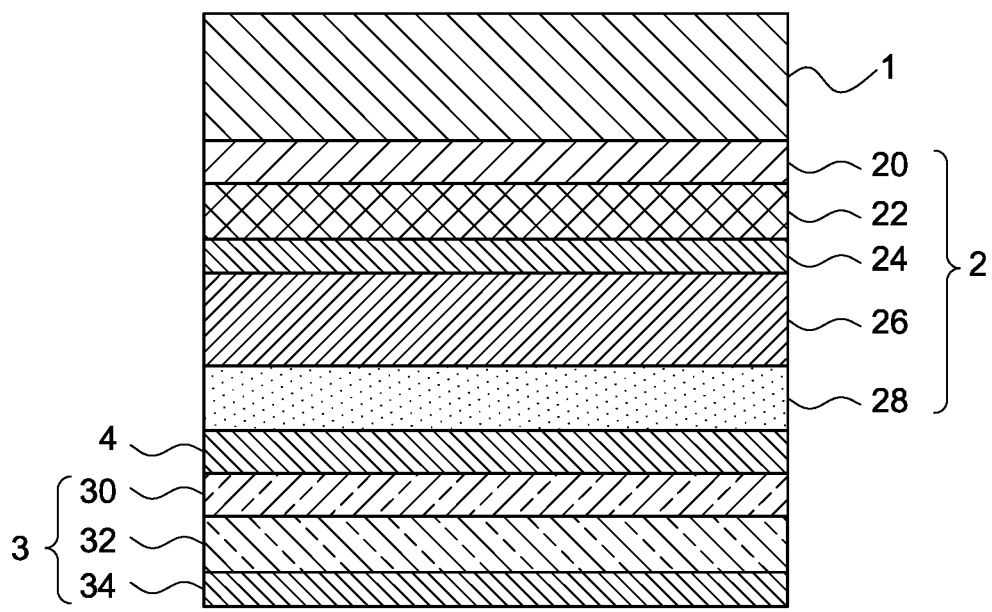
FIG. 1 is a schematic diagram of a first embodiment of the present invention.

Please refer to FIG. 1. The present invention is a display device, including a display module 1, a fingerprint recognition module 2 and a speaker module 3. The display module 1 can be an organic light emitting diode module (Organic Light-Emitting Diode Module, abbreviated as: OLED Module), the display outputs images from the front of the display module 1. The back of the display module 1 is provided with a fingerprint recognition module 2 and a speaker module 3 in sequence. There is a common electrode layer 4 between the fingerprint recognition module 2 and the speaker module 3. When the fingerprint recognition module 2 and the common electrode layer 4 are connected, fingerprint recognition can be performed, and when the speaker module 3 and the common electrode layer 4 are connected, sound can be output.

In the first embodiment of the present invention, please refer to FIG. 1, the fingerprint recognition module 2 includes a first connection layer 20, a signal matching layer 22, a first electrode layer 24, a first piezoelectric layer 26 and a substrate layer 28. The speaker module 3 includes a second connection layer 30, a second piezoelectric layer 32 and a second electrode layer 34. One side of the signal matching layer 22 and the back of the display module 1 are connected together by the first connection layer 20, and the side of the signal matching layer 22 opposite to the first connection layer 20 is provided with a first electrode layer 24. The side of the electrode layer 24 opposite to the signal matching layer 22 is provided with a first piezoelectric layer 26, the side of the first piezoelectric layer 26 opposite to the first electrode layer 24 is provided with a substrate layer 28, and the common electrode layer 4 is provided on the substrate layer 28 opposite the first piezoelectric layer 26. The second connecting layer 30 is connected to the side of the common electrode layer 4 facing away from the substrate layer 28, and the second piezoelectric layer 32 is provided on the side of the second connecting layer 30 facing away from the common electrode layer 4, The second electrode layer 34 is disposed on the side of the second connection layer 30 opposite to the second piezoelectric layer 32.

Figure 2:
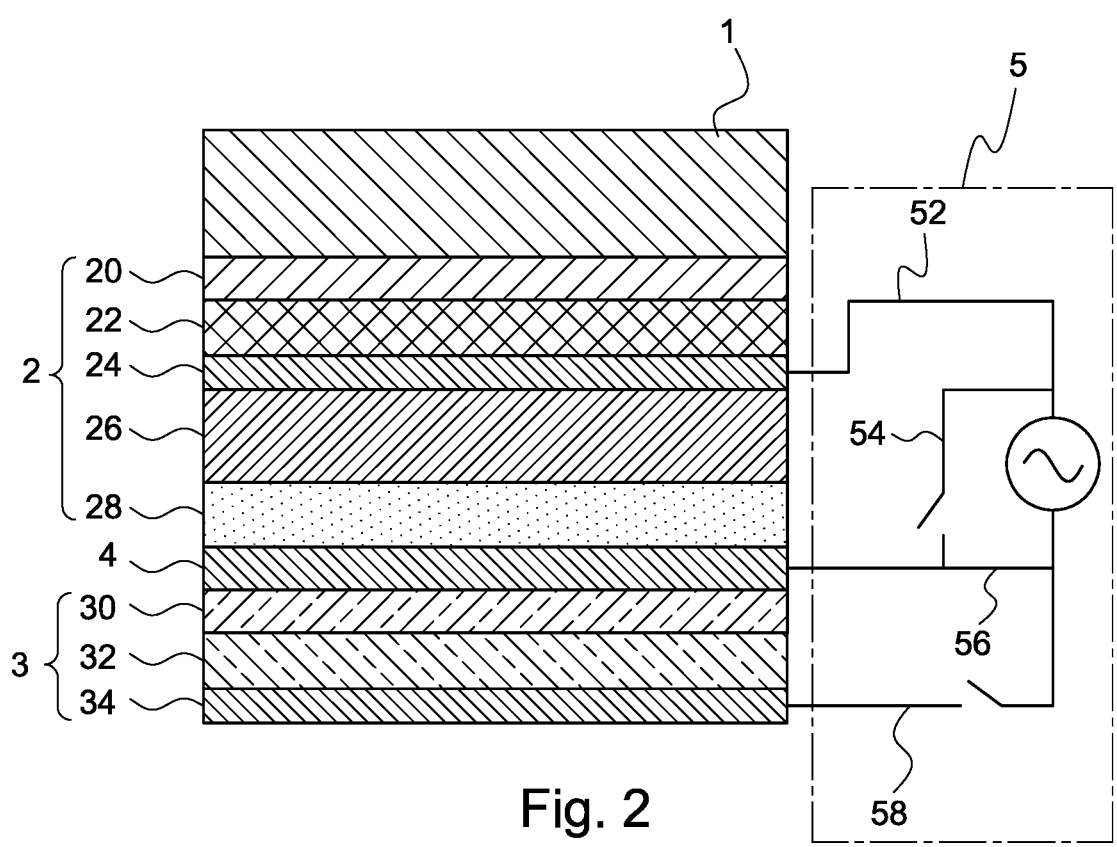

Please refer to FIG. 2, the present invention also includes a switching circuit 5, the switching circuit 5 includes a first circuit 52, a second circuit 54, a third circuit 56 and a fourth circuit 58, wherein the first circuit 52 is connected to the first electrode layer 24, the second circuit 54 and the third circuit 56 are connected to the common electrode layer 4, and the fourth circuit 58 is connected to the second electrode layer 34. Between the first electrode layer 24 and the common electrode layer 4 is sandwiched the first piezoelectric layer 26. When the first circuit 52 and the third circuit 56 are turned on, the voltage difference between the first electrode layer 24 and the common electrode layer 4 causes the first piezoelectric layer 26 to generate an ultrasonic signal, which passes through the signal matching layer 22 and strengthens the transmission of ultrasonic signals to the surface of the display module 1, and the fingerprints of the fingers placed on the surface of the display module 1 will receive the reflected ultrasonic signals (hereinafter referred to as echo signals) by the first piezoelectric layer 26, and then pass through the substrate layer 28 the echo signal is transmitted to the control unit, and the control unit draws a fingerprint based on the echo signal, which can be used for fingerprint recording or fingerprint identification.

Figure 3:
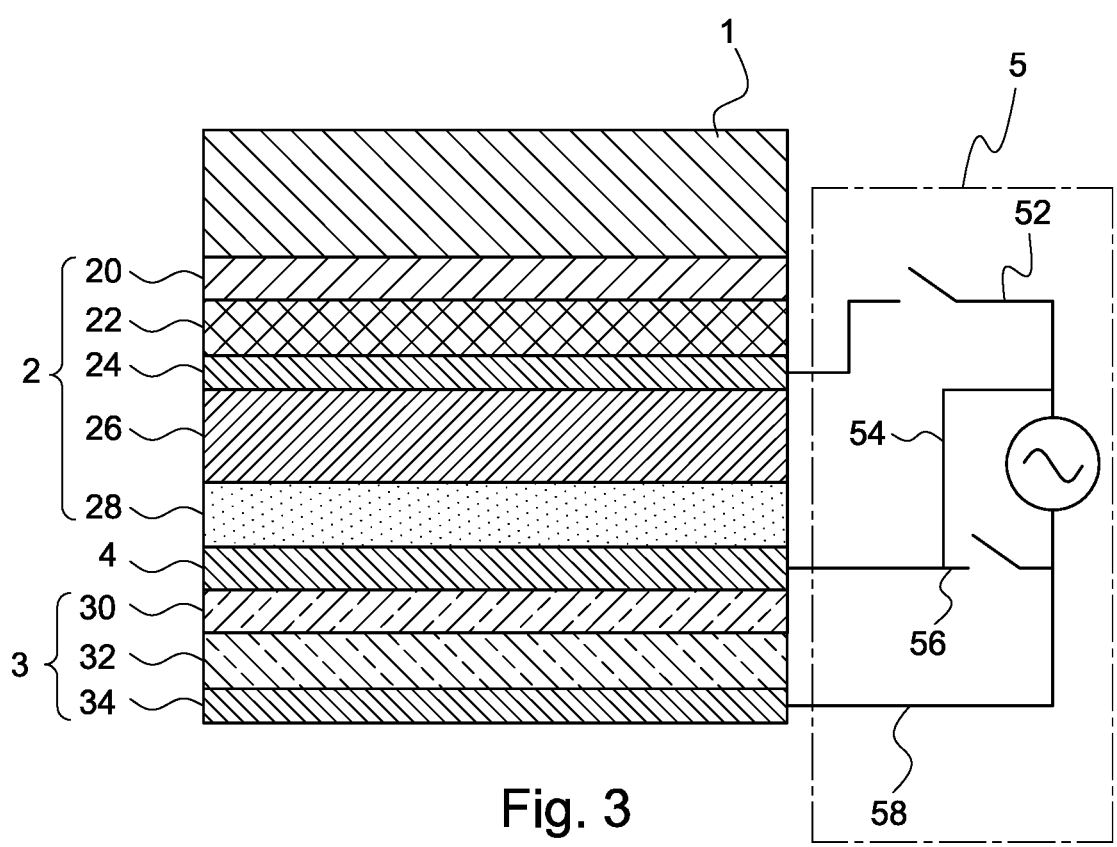
FIG. 3 is a schematic diagram of the conduction of the speaker module of the first embodiment of the present invention.

Please refer to FIG. 3, the common electrode layer 4 and the second electrode layer 34 sandwich the second piezoelectric layer 32. When the second circuit 54 and the fourth circuit 58 are connected, the voltage difference between the common electrode layer 4 and the second electrode layer 34 causes the second piezoelectric layer 32 to transmit a generated sound signal to the outside.

Figure 4:
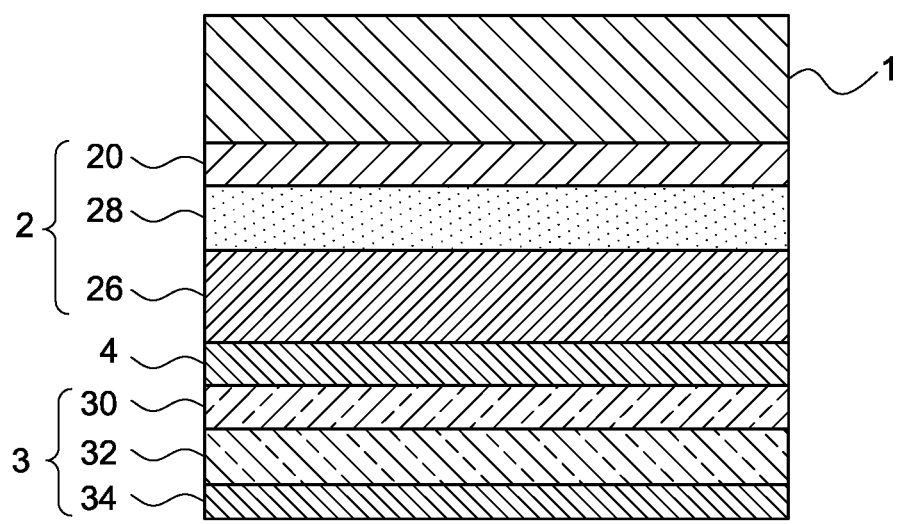
FIG. 4 is a schematic diagram of the second embodiment of the present invention.

In order to further reduce the volume or simplify the manufacturing process, in the second embodiment of the present invention, please refer to FIG. 4, the first embodiment is similar to the second embodiment, and both have the same structure of the speaker module 3, and the structural difference between the two fingerprint recognition modules 2 is that the fingerprint recognition module 2 of the second embodiment includes a first connection layer 20, a substrate layer 28, and a first piezoelectric layer 26. The back surface of the display module 1 and the substrate layer 28 are connected together by the first connection layer 20. The substrate layer 28 is provided with the first piezoelectric layer 26 on the side opposite to the first connection layer 20, and the common electrode layer 4 is provided on the side of a piezoelectric layer 26 facing away from the substrate layer 28, wherein the substrate layer 28 faces the first piezoelectric layer 26. A structure equivalent to the first electrode layer 24 has been added in the manufacturing process, and the first piezoelectric layer 26 is already equivalent, so the signal matching layer 22 can be omitted in this embodiment.

Figure 5:
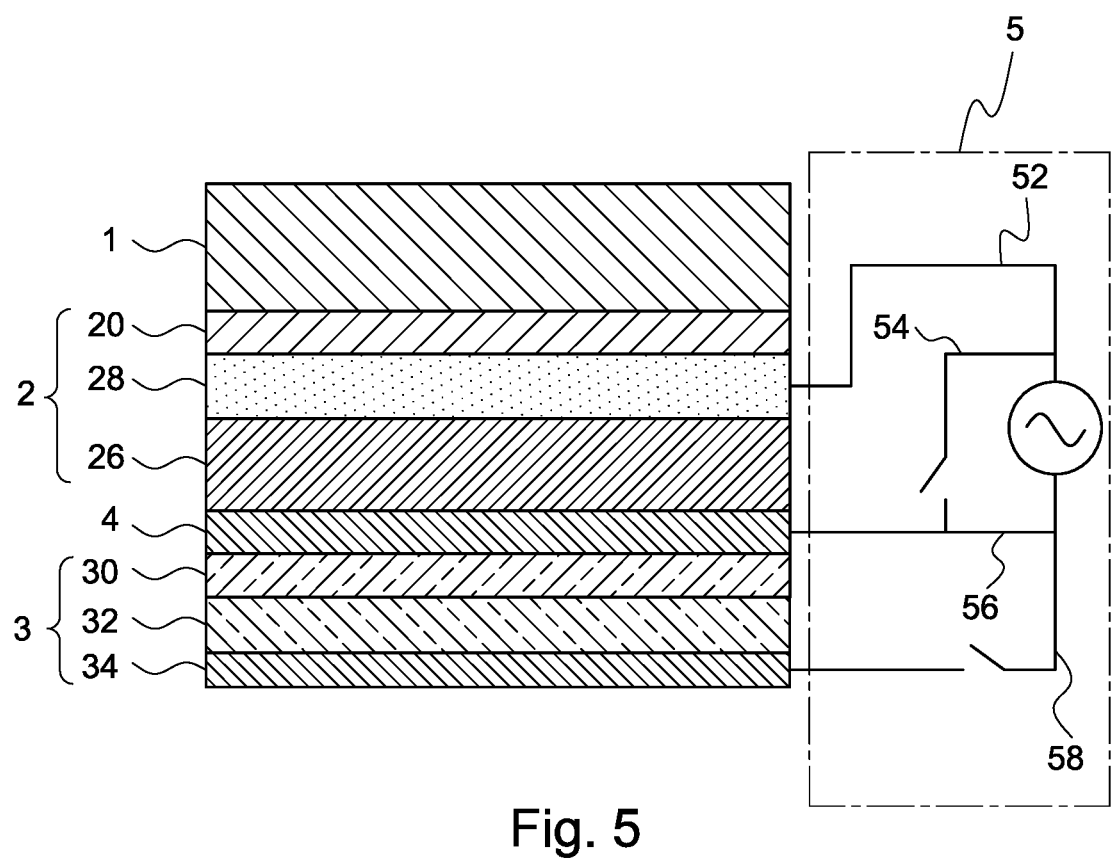
Figure 6:
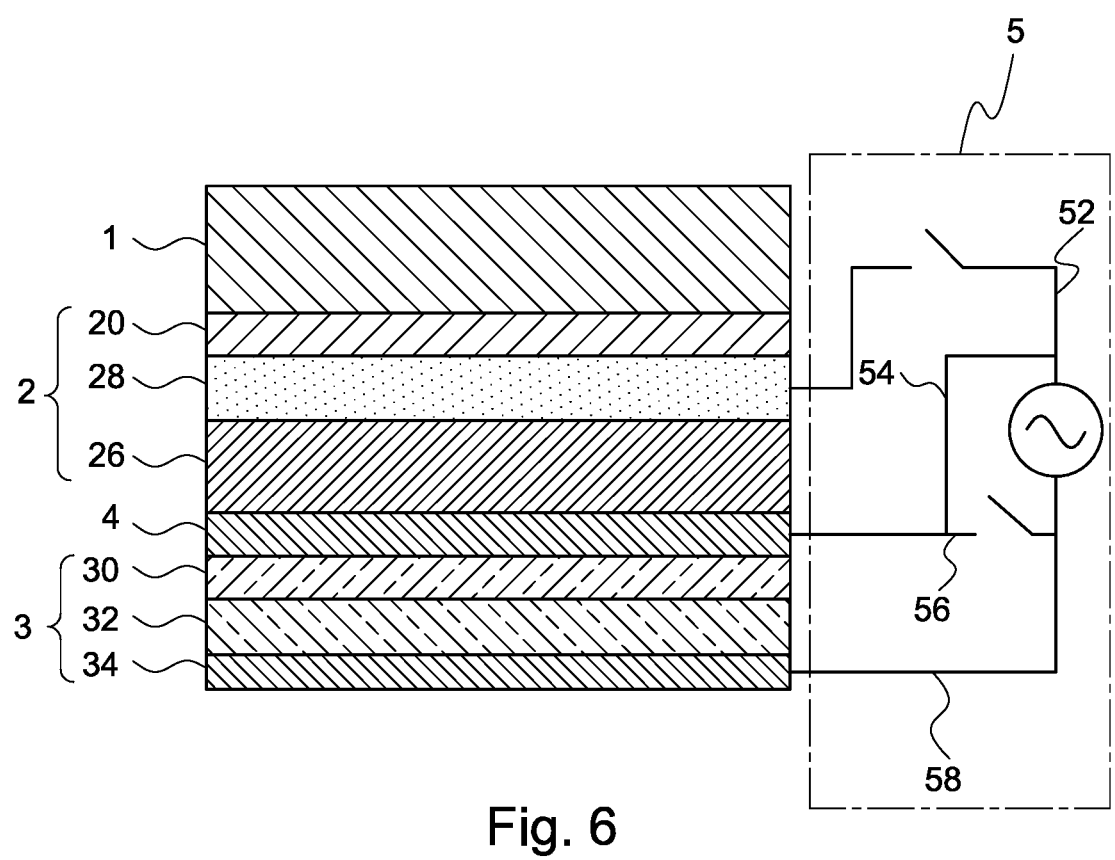
FIG. 6 is a schematic diagram of the conduction of the speaker module of the first embodiment of the present invention.

Continuing from the above, please refer to FIG. 5, where the first circuit 52 is connected to the substrate layer 28, the second circuit 54 and the third circuit 56 are connected to the common electrode layer 4, and the fourth circuit 58 is connected to the second electrode layer 34. The first piezoelectric layer 26 is sandwiched between the substrate layer 28 and the common electrode layer 4. When the first circuit 52 and the third circuit 56 are conductive, the voltage difference between the substrate layer 28 and the common electrode layer 4 makes the first piezoelectric layer 26 generate an ultrasonic signal, and the fingerprint of the finger placed on the surface of the display module 1 will receive the reflected ultrasonic signal by the first piezoelectric layer 26, and then transmit the echo signal to the control unit via the substrate layer 28. The control unit draws fingerprints based on the echo signal, which can be used for fingerprint recording or fingerprint identification. Please refer to FIG. 6, the common electrode layer 4 and the second electrode layer 34 sandwich the second piezoelectric layer 32. When the second circuit 54 and the fourth circuit 58 are connected, when there is a voltage difference between the common electrode layer 4 and the second electrode layer 34, the second piezoelectric layer 32 will generate a sound signal to the outside.

Figure 7:
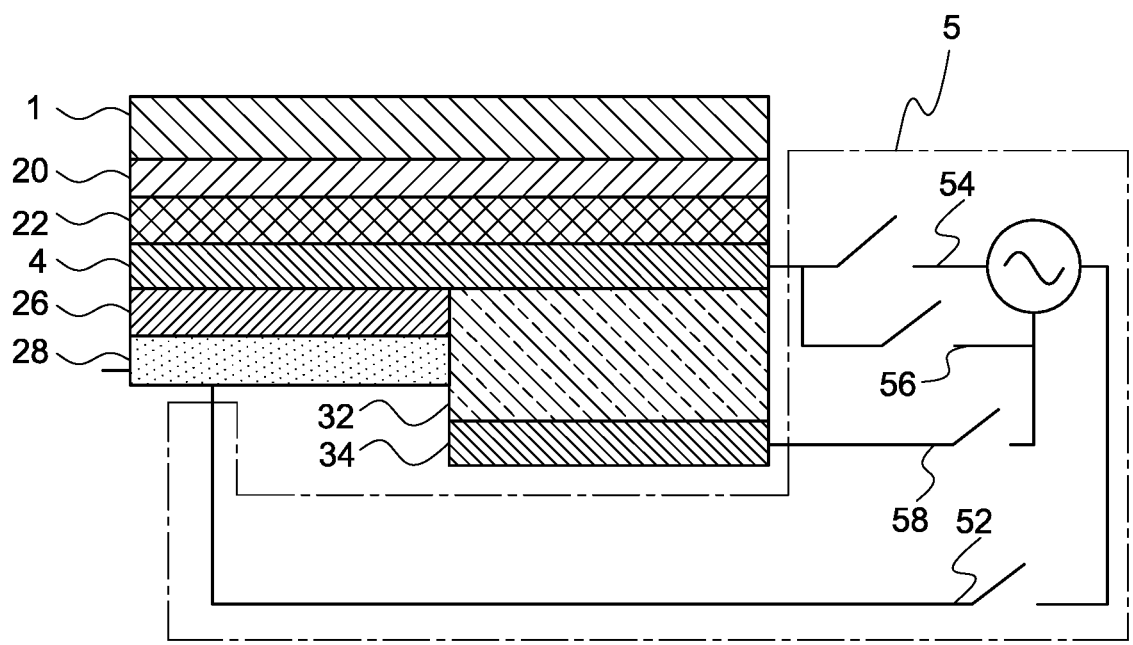
FIG. 7 is a schematic diagram of a third embodiment of the present invention.

In the third embodiment, referring to FIG. 7, the fingerprint recognition module 2 still includes the first connection layer 20, the signal matching layer 22, the first piezoelectric layer 26, and the substrate layer 28, and the speaker module 3 includes the second piezoelectric layer 32 and the second electrode layer 34. One side of the first connection layer 20 is connected to the back of the display module 1, the other side of the first connection layer 20 is provided with a signal matching layer 22, and the side of the signal matching layer 22 opposite to the first connection layer 20 is provided with a common electrode layer 4. The first piezoelectric layer 26 is provided on a partial area of the side of the common electrode layer 4 opposite to the signal matching layer 22, and the substrate layer 28 is provided on the side of the first piezoelectric layer 26 opposite to the common electrode layer 4, and a structure corresponding to the first electrode layer 24 has been added to face the first piezoelectric layer 26 during the manufacturing process. The second piezoelectric layer 32 is provided on the other part of the side of the common electrode layer 4 opposite to the signal matching layer 22, and the second electrode layer 34 is provided on the side of the second piezoelectric layer 32 opposite to the signal matching layer 22. The piezoelectric layer 26 is quite close to the second piezoelectric layer 32. Therefore, the first piezoelectric layer 26 has the effect of strengthening the second piezoelectric layer 32, and increase the power of the enhanced sound.

Continuing from the above, in the third embodiment and the second embodiment, the switching circuit is the same, the first circuit 52 is connected to the substrate layer 28, the second circuit 54 and the third circuit 56 are connected to the common electrode layer 4, and the fourth circuit 58 is connected to the second electrode layer 34. The substrate layer 28 and the common electrode layer 4 sandwich the first piezoelectric layer 26. When the first circuit 52 and the third circuit 56 are connected, the voltage difference between the substrate layer 28 and the common electrode layer 4 causes the first piezoelectric layer 26 to generate an ultrasonic signal, and the ultrasonic signal will be transmitted to the surface of the display module 1 through the signal matching layer 22, and the fingerprint of the finger placed on the surface of the display module 1 will receive the ultrasonic signal and then the first piezoelectric layer 26 receives the echo signal, and then transmits the echo signal to the control unit via the substrate layer 28. The control unit draws a fingerprint based on the echo signal, which can be used for fingerprint recording or fingerprint identification. The common electrode layer 4 and the second electrode layer 34 sandwich the second piezoelectric layer 32. When the second circuit 54 and the fourth circuit 58 are turned on, the voltage difference between the common electrode layer 4 and the second electrode layer 34 makes the second piezoelectric layer 32 transmit the generated sound signal to the outside. Although this structure can reduce the volume, since the first piezoelectric layer 26 is only in a part of the area opposite to the display module 1, it can only be used for fingerprint sensing at a position corresponding to the first piezoelectric layer 26.

In each embodiment of the present invention, when the first circuit 52 and the third circuit 56 are turned on, an AC voltage signal of 10 MHz-20 Mhz is input to drive the first piezoelectric layer 26 to emit an ultrasonic signal. When the second circuit 54 and the fourth circuit 58 are connected, an AC voltage signal within 20 kHz is input, and the first piezoelectric layer 26 is driven to emit an audio signal in the frequency range audible to the human ear. Furthermore, the substrate layer 28 can be a thin film made of polyimide material, and a thin film transistor array circuit is provided on the thin film.

In addition, the first piezoelectric layer 26 and the second piezoelectric layer 32 may be piezoelectric films made of polymers, such as polyvinylidene fluoride (PVDF), or piezoelectric ceramics (PZT). The piezoelectric film can be made of composite materials, such as: piezoelectric ceramic (PZT) and polymer (PVDF or epoxy resin) composite piezoelectric film, its thickness is 1 μm~500 μm. Furthermore, the first electrode layer 24 and the second electrode layer 34 can be made of any conductive material, such as gold, silver, copper, graphite, or conductive polymer . . . etc., with a thickness between 0.3 μm and 100 μm. In addition, the signal matching layer 22 is made of materials with acoustic impedance ranging from 1 to 30 Mkg/m$^2$, where M is 10$^6$, such as epoxy resin, resin ink, etc., with a thickness of between 1 μm~200 μm. The size of the display module 1 ranges from 1 to 50 inches, and the first connection layer 20 and the second connection layer 30 are both films made of Pressure Sensitive Adhesive (PSA). However, when the present invention is actually implemented, the materials of each layer structure described above are not limited to this, as long as they can have the aforementioned functions are within the scope of the present invention.

In summary, when a voltage difference is generated between the common electrode layer 4 and the first electrode layer 24, the first piezoelectric layer 26 have a fingerprint recognition function, or when there is a voltage difference between the common electrode layer 4 and the second electrode layer 34, the second piezoelectric layer 32 will function and have a speaker function. In addition, when the substrate layer 28 is made to have a structure equivalent to the first electrode layer 24, so that a voltage difference is generated between the common electrode layer 4 and the substrate layer 28, the first piezoelectric layer 26 will function and have a fingerprint recognition function. In this way, a fingerprint recognition module and a speaker module are arranged under the display module simultaneously, and the fingerprint recognition function is completely or partially arranged under the display module 1, and the user can perform fingerprint recognition at any position on the surface of the display at will.

The above detailed description is a specific description of the feasible embodiments of the present invention, but the foregoing embodiments are not used to limit the scope of the present invention. Any equivalent implementation or modification that does not deviate from the technical spirit of the present invention should be included in the patent scope of this case.

What is claimed is:

1. A display device, including:
   a display module;
   a fingerprint recognition module disposed on a back surface of the display module;
   a common electrode layer disposed on a back surface of the fingerprint recognition module of the display module; and
   a speaker module disposed on a side of the common electrode layer away from the fingerprint recognition module;
   wherein, the fingerprint recognition module is connected to the common electrode layer to recognize fingerprints, and the speaker module is connected to the common electrode layer to output sound signals;
   wherein the fingerprint recognition module includes:
      a first connection layer, one side of the first connection layer is connected to the back surface of the display module;
      a signal matching layer, one side of the signal matching layer is connected to a side of the first connection layer away from the display module;
      a first electrode layer, one side of the first electrode layer is connected to the signal matching layer away from the first connection layer;
      a first piezoelectric layer, one side of the first piezoelectric layer is connected to a side of the first electrode layer away from the signal matching layer; and
      a substrate layer, one side of the substrate layer is connected to a side of the first piezoelectric layer away from the first electrode layer;
   wherein the speaker module includes:
      a second connection layer, the second connection layer is connected to a side of the common electrode layer opposite to the substrate layer;
      a second piezoelectric layer, the second piezoelectric layer is disposed on a side of the second connection layer that is opposite to the common electrode layer; and
      a second electrode layer, the second electrode layer is arranged on a side of the second connection layer away from the second piezoelectric layer.

2. The display device according to claim 1, wherein acoustic impedance of the signal matching layer is between 1-30 Mkg/m2.

3. The display device according to claim 1, which further includes a switching circuit, and the switching circuit includes:
   a first circuit connected to the first electrode layer;
   a second circuit connected to the common electrode layer;
   a third circuit connected to the common electrode layer; and
   a fourth circuit connected to the second electrode layer;
   wherein, when the first circuit and the third circuit are turned on, the voltage difference between the first electrode layer and the common electrode layer causes the first piezoelectric layer to generate ultrasonic signals, and the signal matching layer strengthens the transmission of ultrasonic signals so that the ultrasonic signal reaches the surface of the display module, the first piezoelectric layer receives the reflected ultrasonic signal, and then transmits it through the substrate layer, and when the second circuit and the fourth circuit are turned on, the voltage difference between the common electrode layer and the second electrode layer causes the second piezoelectric layer to output sound signals.

4. The display device according to claim 1, wherein the first piezoelectric layer and the second piezoelectric layer are piezoelectric films made of polymers and piezoelectric films made of piezoelectric ceramics or one of the composite piezoelectric films is composed of piezoelectric ceramics and polymers, with a thickness between 1 μm and 200 μm.

5. The display device according to claim 1, wherein the first electrode layer and the second electrode layer are made of conductive materials and have a thickness between 0.3 μm and 100 μm.

6. A display device, including:
   a display module;
   a fingerprint recognition module disposed on a back surface of the display module;
   a common electrode layer disposed on a back surface of the fingerprint recognition module of the display module; and
   a speaker module disposed on a side of the common electrode layer away from the fingerprint recognition module;
   wherein, the fingerprint recognition module is connected to the common electrode layer to recognize fingerprints, and the speaker module is connected to the common electrode layer to output sound signals;
   wherein the fingerprint recognition module includes:
      a first connection layer connected to the back surface of the display module;
      a substrate layer, the substrate layer is connected to a side of the first connection layer away from the display module, and a first electrode layer is disposed in the substrate layer; and
      a first piezoelectric layer is arranged on a side of the substrate layer away from the first connection layer;
   wherein the speaker module includes:

a second connection layer, the second connection layer is connected to a side of the common electrode layer opposite to the substrate layer;

a second piezoelectric layer, the second piezoelectric layer is disposed on a side of the second connection layer that is opposite to the common electrode layer; and a second electrode layer, the second electrode layer is arranged on a side of the second connection layer away from the second piezoelectric layer.

7. The display device according to claim 6, which further includes a switching circuit, and the switching circuit includes:

a first circuit connected to the substrate layer;
a second circuit connected to the common electrode layer;
a third circuit connected to the common electrode layer; and
a fourth circuit connected to the second electrode layer;

wherein, when the first circuit and the third circuit are turned on, the voltage difference between the substrate layer and the common electrode layer causes the first piezoelectric layer to generate an ultrasonic signal, and the ultrasonic signal is strengthened to transmit the ultrasonic signal through the signal matching layer to the surface of the display module, the first piezoelectric layer receives the reflected ultrasonic signal, and then transmits it through the substrate layer, and when the second circuit and the fourth are turned on, the voltage difference between the common electrode layer and the second electrode causes the second piezoelectric layer to output sound signals.

8. The display device according to claim 6, wherein the first piezoelectric layer and the second piezoelectric layer are piezoelectric films made of polymer, piezoelectric films made of piezoelectric ceramics, or composite piezoelectric films composed of piezoelectric ceramics and polymers, with a thickness between 1 μm and 200 μm.

9. The display device according to claim 6, wherein the first connection layer and the second connection layer are both films made of pressure sensitive adhesive.

10. The display device according to claim 6, wherein the first electrode layer and the second electrode layer are made of conductive materials and have a thickness between 0.3 μm and 100 μm.

11. A display device, including:

a display module;
a fingerprint recognition module disposed on a back surface of the display module;
a common electrode layer disposed on a back surface of the fingerprint recognition module of the display module; and
a speaker module disposed on a side of the common electrode layer away from the fingerprint recognition module;

wherein, the fingerprint recognition module is connected to the common electrode layer to recognize fingerprints, and the speaker module is connected to the common electrode layer to output sound signals;

wherein the fingerprint recognition module includes:

a first connection layer, one side of the first connection layer is connected to the back surface of the display module;

a signal matching layer, the signal matching layer is disposed on a side of the first connection layer facing away from the display module, and the common electrode layer is disposed on a side of the signal matching layer facing away from the first connection layer;

a first piezoelectric layer, the first piezoelectric layer being disposed on a partial area of the common electrode layer away from the signal matching layer; and a substrate layer, the substrate layer is arranged on a side of the first piezoelectric layer away from the common electrode layer;

wherein the speaker module includes:

a second piezoelectric layer, the second piezoelectric layer being disposed on another partial area of a side of the common electrode layer facing away from the signal matching layer; and a second electrode layer, the second electrode layer is arranged on a side of the second piezoelectric layer away from the signal matching layer.

12. The display device according to claim 11, further including a switching circuit, the switching circuit includes:

a first circuit connected to the substrate layer;
a second circuit connected to the common electrode layer;
a third circuit connected to the common electrode layer; and
a fourth circuit connected to the second electrode layer;

wherein, when the first circuit and the third circuit are turned on, the voltage difference between the substrate layer and the common electrode layer causes the first piezoelectric layer to generate an ultrasonic signal, and the signal matching layer strengthens the transmission of the ultrasonic signal to the surface of the display module, the first piezoelectric layer receives the reflected ultrasonic signal, and then transmits it through the substrate layer, and when the second circuit and the fourth circuit are turned on, the voltage difference between the common electrode layer and the second electrode layer causes the second piezoelectric layer to output sound signals.

13. The display device according to claim 11, wherein the signal matching layer has an acoustic impedance of 1-30 Mkg/m2, and a thickness of 1 μm-200 μm.

14. The display device according to claim 11, wherein the first piezoelectric layer and the second piezoelectric layer are piezoelectric films made of polymers, piezoelectric films made of piezoelectric ceramics, or composite piezoelectric films composed of piezoelectric ceramics and polymers.

15. The display device according to claim 11, wherein the first electrode layer and the second electrode layer are made of conductive materials and have a thickness of 0.3 μm~100 μm.

* * * * *